(12) United States Patent
Heinrich et al.

(10) Patent No.: US 7,416,067 B2
(45) Date of Patent: Aug. 26, 2008

(54) POWER TRANSMISSION UNIT

(75) Inventors: Johannes Heinrich, Friedrichsdorf (DE); Hans Juergen Hauck, Karlsruhe (DE)

(73) Assignee: BorgWarner Inc., Auburn Hills, MI (US)

( * ) Notice: Subject to any disclaimer, the term of this patent is extended or adjusted under 35 U.S.C. 154(b) by 346 days.

(21) Appl. No.: 11/244,841

(22) Filed: Oct. 6, 2005

(65) Prior Publication Data

US 2006/0081435 A1    Apr. 20, 2006

(30) Foreign Application Priority Data

Oct. 6, 2004  (EP)  .................................. 04023814

(51) Int. Cl.
*F16D 13/68*  (2006.01)
(52) U.S. Cl. .................................. 192/70.2; 192/70.16
(58) Field of Classification Search ................ 192/70.2, 192/87.11, 87.15, 70.16
See application file for complete search history.

(56) References Cited

U.S. PATENT DOCUMENTS 5,419,417 A * 5/1995 Madsack .................... 192/70.2
7,147,095 B2 * 12/2006 Kraxner et al. ........... 192/87.15

FOREIGN PATENT DOCUMENTS

WO    WO 03/102438 A1 * 12/2003

* cited by examiner

*Primary Examiner*—Rodney H Bonck
(74) *Attorney, Agent, or Firm*—Warn Partners, P.C.

(57) ABSTRACT

The invention relates to a power transmission unit, in particular a multiple disk clutch or friction brake, in which a disk carrier that has at least one disk, which has external teeth and is fastened to it in a non-rotating fashion, which disk carrier, in a cylinder section and oriented toward the disk, has axial grooves and axial ribs distributed over the circumference in alternating fashion and is connected to a hub on one side by means of a drive plate spaced axially apart from the disks; a non-rotatable connection between the drive plate and the disk carrier is produced by means of plug-in teeth in order to transmit a torque. The object of the invention is to propose a power transmission unit (1) in which the axial space is reduced. This object is attained in that additional means are provided for axially fastening the drive plate to the disk carrier; the axial fixing means are embodied so that axial forces that the drive plate exerts on the disk carrier exclusively engage the region of the disk carrier that extends axially from the drive plate in the direction of the disks.

32 Claims, 12 Drawing Sheets

PRIOR ART  Fig. 2

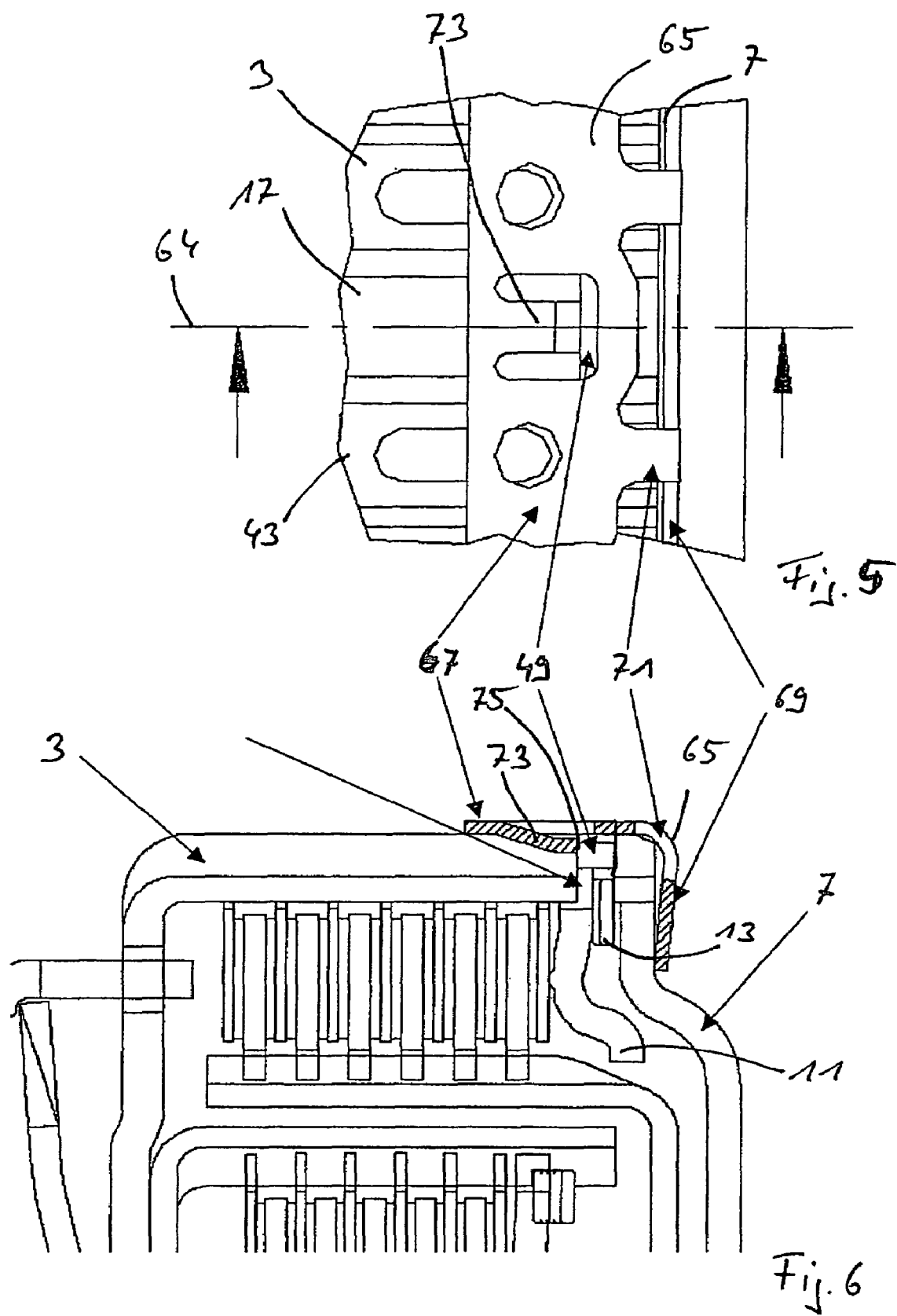

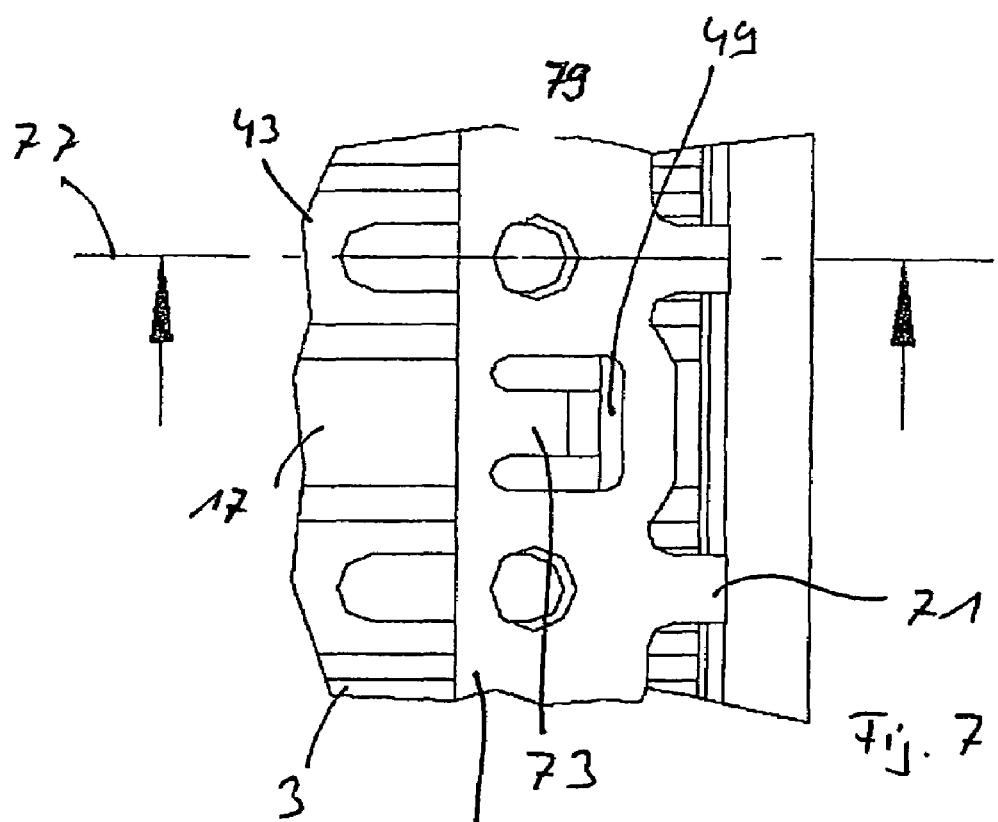
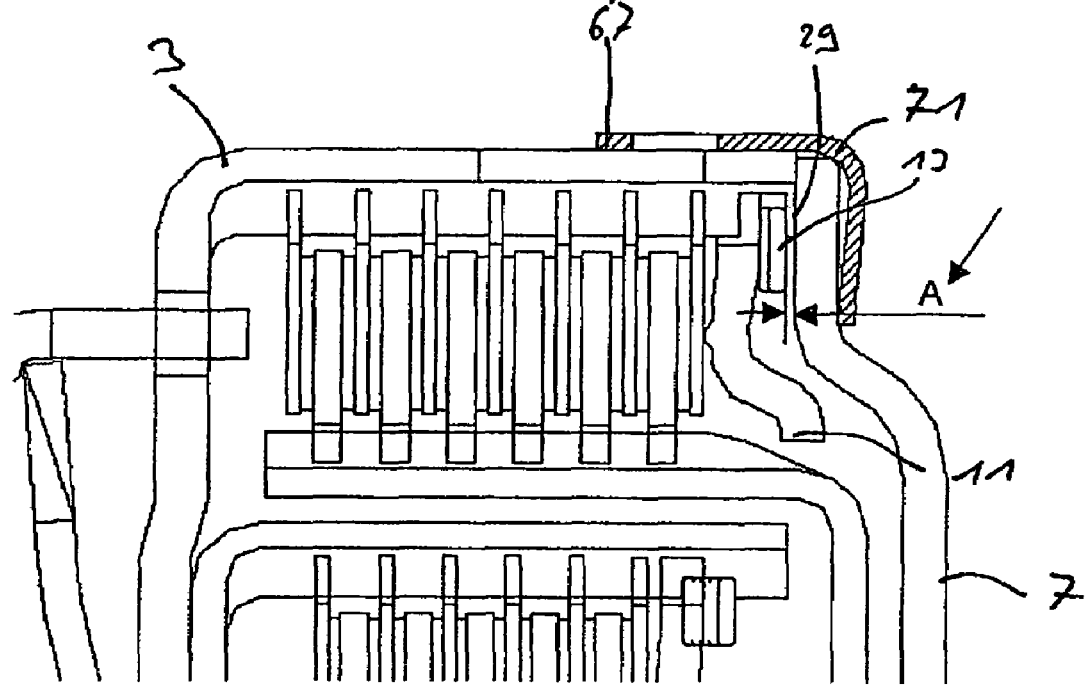
Fig. 7
Fig. 7a

POWER TRANSMISSION UNIT

CROSS-REFERENCE TO RELATED APPLICATIONS

This application claims priority to European Patent Application No. 04 023814.9 filed on Oct. 6, 2004.

FIELD OF THE INVENTION

The invention relates to a power transmission unit.

BACKGROUND OF THE INVENTION

A power transmission unit of the species-defining type is described, for example, in EP 1,422,430 A1. Usually, in multiple disk clutches, for example in a double clutch, the disk pack and the drive plate are each fixed axially in the disk carrier by means of a snap ring. As a rule, a suitable snap ring thickness is also used here to set the air space of the disks in the disk pack. In addition, the drive plate should also be axially fixed with as little play as possible.

In order to prevent the drive plate from chattering within the possible play in the circumference direction when the internal combustion engine is idling, the axial fixing of the drive plate can be preloaded in the axial direction. This generates a moment of friction in the connection between the drive plate and the disk carrier, which is sufficient to prevent the reciprocal movements between the disk carrier and the drive plate.

With the known power transmission unit, in which the drive plate is axially fixed by means of a snap ring, the axial reservoir capacity needs to be relatively long since for strength reasons, a certain material thickness must be provided between the securing ring groove that accommodates the snap ring and the axial end of the disk carrier in the axial direction in order to be able to absorb the forces acting on the drive plate in the axial direction.

Frequently, the available axial space is very limited, particularly in the region of the disk carrier itself, because an additional damper or dual mass flywheel is usually situated here.

The object of the invention, therefore, is to propose a power transmission unit in which the axial space is reduced.

SUMMARY OF THE INVENTION

The invention is based on the concept of fastening the drive plate exclusively on the clutch side in order to transmit the forces acting in the axial direction on the drive plate into the region of the disk carrier, which extends axially from the drive plate toward the disks. Since the region of the disk carrier that extends axially outward from the drive plate no longer has a holding function, it can be embodied in a correspondingly shortened form. In principle, the embodiment of the power transmission unit according to the invention makes it possible for the disk carrier to extend in the axial direction only to the drive plate and no further.

The invention proposes various possibilities for embodying the means for axially fixing the drive plate to the disk carrier.

According to the invention, the means for axially fixing the drive plate are embodied so that they engage behind the drive plate on the side oriented away from the disks in order to redirect the axial forces acting in this direction into the clutch region of the disk carrier. In order to prevent the drive plate from chattering when the internal combustion engine is idling, the drive plate with the means for axially fixing is preloaded against the disk carrier.

One possibility for force redirection lies in attaching the axial fixing means to the disk carrier from the inside. It is advantageous if the axial fixing means are embodied in the form of a closed annular securing element that is fixed to the disk carrier in the axial direction from the inside. The securing element has holding fingers, which are distributed over its circumference, point in the axial direction toward the drive plate, and are guided through axial openings in the drive plate. The free ends of the holding fingers are bent and engage behind the drive plate so that they can absorb forces acting in the axial direction and transmit them via the holding fingers to the securing element in the region of the disk carrier, which extends axially from the drive plate in the direction of the disks.

Usually, a back plate is provided between the disks and the drive plate in order to limit the axial movement of the disks. As a rule, this back plate is fixed to the disk carrier by means of a snap ring. The snap ring is held in a circumferential securing ring groove in the axial ribs of the disk carrier. In the embodiment of the invention, it is advantageous that the securing element is clamped between the back plate and the snap ring. In order to fix the securing element to the disk carrier in a rotationally fixed manner, the securing element is provided with external teeth that engage in axial grooves of the disk carrier.

According to a modification of the invention, the bent ends of the holding fingers are accommodated in radially extending recesses in the drive plate in order to prevent the bent ends from protruding beyond the disk carrier in the axial direction. This makes it possible to further shorten the axial space.

In order for the drive plate to be preloaded axially against the disk carrier, the preloading force that the holding fingers exert on the drive plate is stored in a sprung fashion.

To permit a positioning of the securing element in the circumference direction, positioning means are provided that are embodied, for example, in the form of a hook that engages in a recess in the back plate.

By contrast with the design type according to EP 1,422,430 A1, the transmitted torque can be increased because according to the cited prior art, of the thirty axial ribs provided, only twenty axial ribs are available to absorb the torque by means of the dovetail-shaped teeth of the drive plate while the snap ring for axial fixing is fixed in grooves of ten axial ribs. The embodiment of the power transmission unit according to the invention now permits a dovetail-shaped tooth of the drive plate to be associated with each axial rib, which permits the torque transmission capacity to be increased by 50% with the same number of axial ribs.

According to another embodiment form of the invention, the annular securing element has external teeth with which it can be inserted into a circumferential groove preferably provided in the axial ribs of the disk carrier. In particular, this is the securing ring groove for accommodating the snap ring for axially fixing the disk pack. During assembly, the external teeth of the securing element are inserted axially into the axial grooves of the disk carrier in the direction of the disk pack and are then rotated in the circumference direction, which causes the external teeth to engage in the circumferential groove in the disk carrier. If this circumferential groove is the securing ring groove for holding the snap ring for the disk pack, then the disks, the back plate, and the snap ring must be preassembled before the securing element is threaded into place. In this case, during rotation of the securing element, the external teeth slide between the snap ring and the groove wall.

Then the drive plate is placed against the axial holding fingers of the securing element, which causes the external teeth of the drive plate to engage in the disk carrier. To permit the holding fingers to pass through, the drive plate has a number of small windows distributed over its circumference. A preloading ring in the form of bayonet locking mechanism is now inserted between the bent ends of the holding fingers and the drive plate; rotation of the preloading ring preloads the drive plate against the disk carrier. To this end, the preloading ring has slots distributed over its circumference and extending in the circumference direction, which permit the holding fingers to pass through; along at least one longitudinal side of each slot, a ramp is provided, which widens axially in the circumference direction. To provide good contact conditions between the ramps and the bent ends of the holding fingers, the bent ends of the holding fingers are bent in the circumference direction.

To prevent the preloading ring from loosening under operating conditions, it is fixed to the drive plate. According to the invention, the preloading ring has tabs distributed over the circumference, which can be bent into windows of the drive plate. If the preloading ring has a certain number of tabs distributed over its circumference and the drive plate has a similarly large number of windows in a different distribution, then with a suitable reciprocal arrangement for finely divided positions of the preloading ring in relation to the drive plate, there is always at least one tab that can be bent into a window of the drive plate—as compared with the conventional arrangement of shaft nut grooves and associated securing plate tabs.

This embodiment form also allows the maximum transmittable torque to be increased in relation to known devices in that all of the teeth or virtually all of the teeth of the drive plate transmit a partial torque to the disk carrier.

Another possibility for force redirection is to fasten the axial fixing means to the disk carrier from the outside.

To this end, it is advantageous that the axial fixing means are embodied in the form of a preferably closed, bent ring that has a radial ring section and an axial ring section coaxial to the disk carrier; the ring can be fixed to the disk carrier by means of the axial ring section and rests with the radial ring section against the back side of the drive plate. With a corresponding strength of the axial ring section partially encompassing the disk carrier, this ring prevents the disk carrier from expanding during operation. This makes it possible to eliminate the hard-to-install dovetail teeth between the disk carrier and the drive plate.

Distributed over its circumference, the axial ring section has resilient tabs extending in the axial direction and bent toward the disk carrier for fixing it to the disk carrier; the free ends of the tabs point toward the radial ring section. When the tabs are snapped onto the disk carrier, the radial ring section, which is embodied in the form of a disk spring, is preloaded and presses the external teeth of the drive plate against a stop in the disk carrier. This produces the flow of force between the drive plate and the external disk carrier, which, with a corresponding preloading force of the disk spring and the tabs, prevents the drive plate and the external disk carrier from striking each other, thus preventing rattling noises.

If the axial ring section covers the oil windows in the disk carrier, then it is advantageous to provide corresponding openings in the axial ring section itself so as not to hinder the flow of oil through the disk pack contained in the disk carrier.

The embodiment according to the invention of the means for axially fixing the disk carrier makes it possible to transmit the torque to the disk carrier by means of a larger number of teeth in the external denticulation on the drive plate than is the case in known power transmission units. It is even possible for each tooth of the external denticulation on the drive plate to transmit a portion of the torque.

One advantageous possibility for embodying the plug-in teeth is for the shape of the external teeth to be complementary to that of the axial ribs and axial grooves of the disk carrier. The number of teeth in the external denticulation corresponds to the number of axial grooves on the disk carrier; the tooth thickness of the external denticulation of the drive plate in the circumference direction is embodied so that there is almost no play between the drive plate and the external disk carrier. In order to fix the drive plate in the direction of the disk pack, a number of axial stops are required between the drive plate and the disk carrier. To this end, several teeth of the external denticulation on the drive plate are elongated in the radial direction; the radially elongated sections engage in notches in the axial grooves of the disk carrier and rest axially against the disk carrier. Since these notches are provided in the axial grooves, they can be produced regardless of the position of the securing ring groove situated in the axial ribs, which permits the drive plate to be positioned so that it almost rests against the securing ring groove. This achieves an additional advantage in terms of space. A small distance between the drive plate stop and the securing ring groove of the snap ring for the disk pack is required for tolerance reasons and due to the elasticity of the components in order to thus prevent the drive plate from resting against the securing ring.

Naturally, the external teeth of the drive plate can also be embodied in the form of dovetail teeth, which in addition to transmitting the motor moment, also prevents the external disk carrier from expanding radially due to the speed. In this case, the axial annular section has no holding function for preventing radial expansion of the disk carrier. However, due to the elimination of a snap ring for axially fixing the drive plate, the torque can be transmitted by all of the teeth of the external disk carrier. The number of dovetail teeth then corresponds to the number of axial ribs of the disk carrier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described in detail in conjunction with the drawings, which depict several exemplary embodiments of the invention.

FIG. 5, is a top view of a detail of another embodiment form of the power transmission unit, FIG. 6, shows a section through the power transmission unit along the cutting line indicated in FIG. 5, FIG. 7, is a top view of a detail of a power transmission unit, FIG. 7a, shows a section through a power transmission unit along the cutting line indicated in FIG. 7, FIG. 8, is a perspective, exploded depiction showing the disk carrier, the drive plate, and the bent fixing ring.

DETAILED DESCRIPTION OF THE PREFERRED EMBODIMENTS

Figure 1:
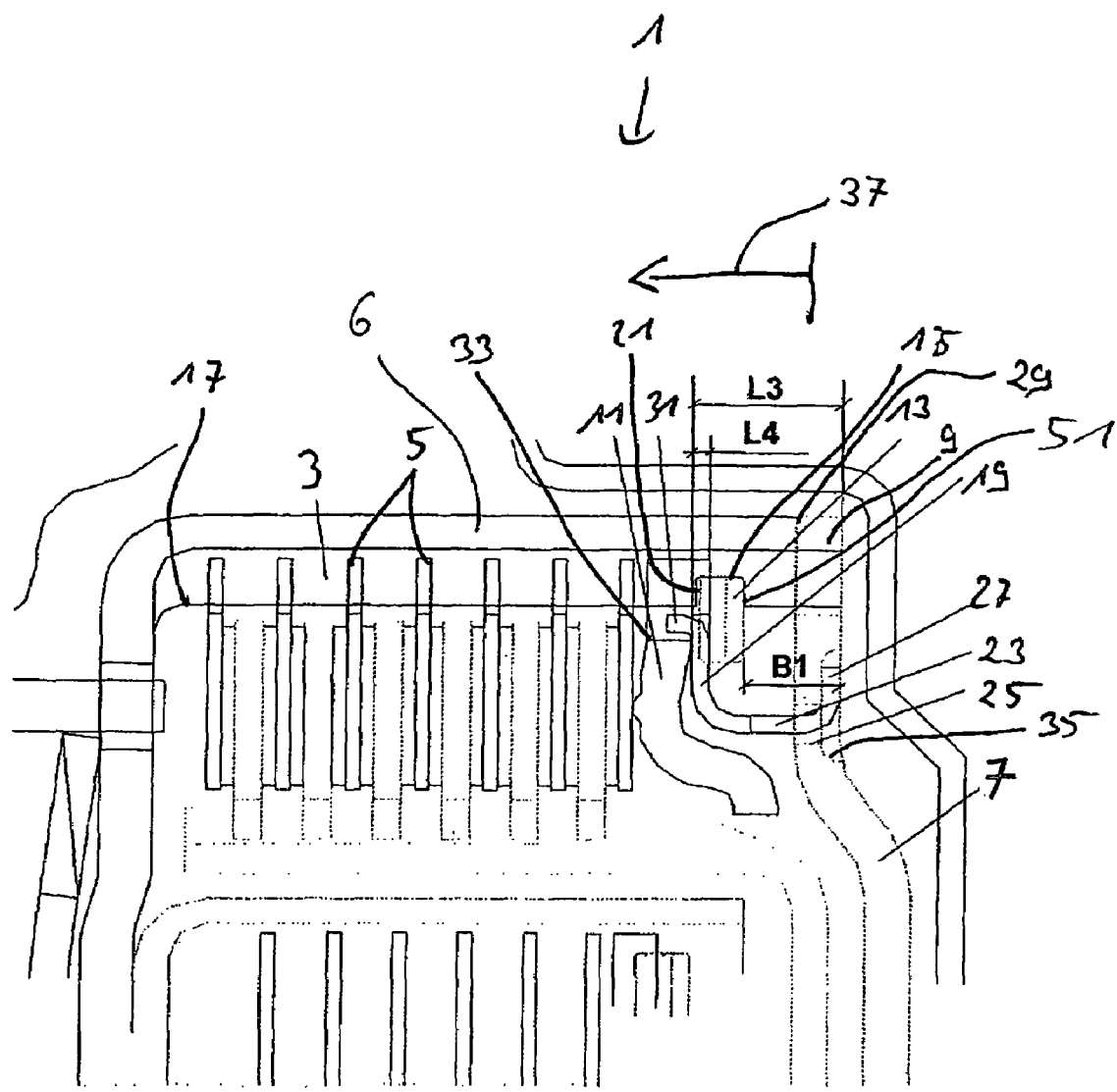
FIG. 1, shows an axial section through a first embodiment form of a power transmission unit.

In the figures, parts that are the same or function in the same manner have been provided with the same reference numerals.

FIG. 1 shows a section through a part of a power transmission unit 1. The invention is explained by way of example in conjunction with a double clutch, but can also be implemented in all power transmission units equipped with a disk carrier and a drive plate.

The double clutch has an external disk carrier 3 that carries a number of axially spaced external disks 5 that are connected in a non-rotating fashion to the external disk carrier 3 by means of plug-in teeth. The external teeth of the external disks 5 engage in axial ribs 17 and axial grooves 43 of the disk carrier 3 that are distributed in alternating fashion over the circumference, on the side oriented toward the disks. The axial ribs 17 and axial grooves 43 extend along a cylindrical section 6 of the disk carrier 3. A drive plate 7 situated in the axial end region of the external disk carrier 3 connects the external disk carrier 3 to a driven hub that is not shown. To transmit a torque from the drive plate 7 to the external disk carrier 3, plug-in teeth are provided between the drive plate 7 and the external disk carrier 3, which provide for a rotationally fixed connection between the two components. On the drive plate, the plug-in teeth are embodied in the form of external teeth 9; the external teeth 9 cooperate with the axial grooves 43 and/or the axial ribs 17 of the external disk carrier.

In order to limit the axial movement of the external disks 5, a circumferential, annular back plate 11 is provided. The back plate 11 is fixed in the axial direction by means of a snap ring 13. The snap ring extends in a securing ring groove 15, which is let into the axial ribs 17 of the external disk carrier 3 in the circumference direction, preferably by being stamped into them. The air space between the disks 5 is set by means of a suitable snap ring thickness. An annular, closed securing element 19 is clamped between the back plate 11 and snap ring 13. The securing element can also be clamped between the snap ring 13 and the groove wall 51. The securing element 19 has external teeth 21 that engage in the axial grooves of the disk carrier 3 to prevent the securing element from rotating in the circumference direction. The securing element has axially protruding holding fingers 23 distributed over the circumference, which are guided through corresponding axial openings 25 in the drive plate 7. The free ends 27 are bent after assembly and thus engage behind the drive plate 7. The holding fingers 23 preload the drive plate 7 against the external disk carrier 3. The drive plate 7 rests in the axial direction against stops 29 on the external disk carrier 3. The securing element 19 is embodied, for example, in the form of a disk spring and stores the preloading force that the holding fingers 23 exert on the drive plate 7. It is also conceivable to additionally or alternatively embody the holding fingers 23 in a resilient fashion, e.g. as bending springs.

To additionally reduce the structural length, the bent ends 27 of the holding fingers 23 are accommodated in radially extending recesses 35 on the outside of the drive plate 7.

In order to assure an exact positioning of the securing element 19 in the circumference direction, at least one hook 31 is provided, which axially engages in a recess 33 in the back plate 11.

The embodiment of the power transmission unit 1 according to the invention causes all of the axial forces that the drive plate exerts on the disk carrier to engage solely the region 37 of the external disk carrier 3 that extends axially from the drive plate 7 toward the disks 5.

Figure 2:
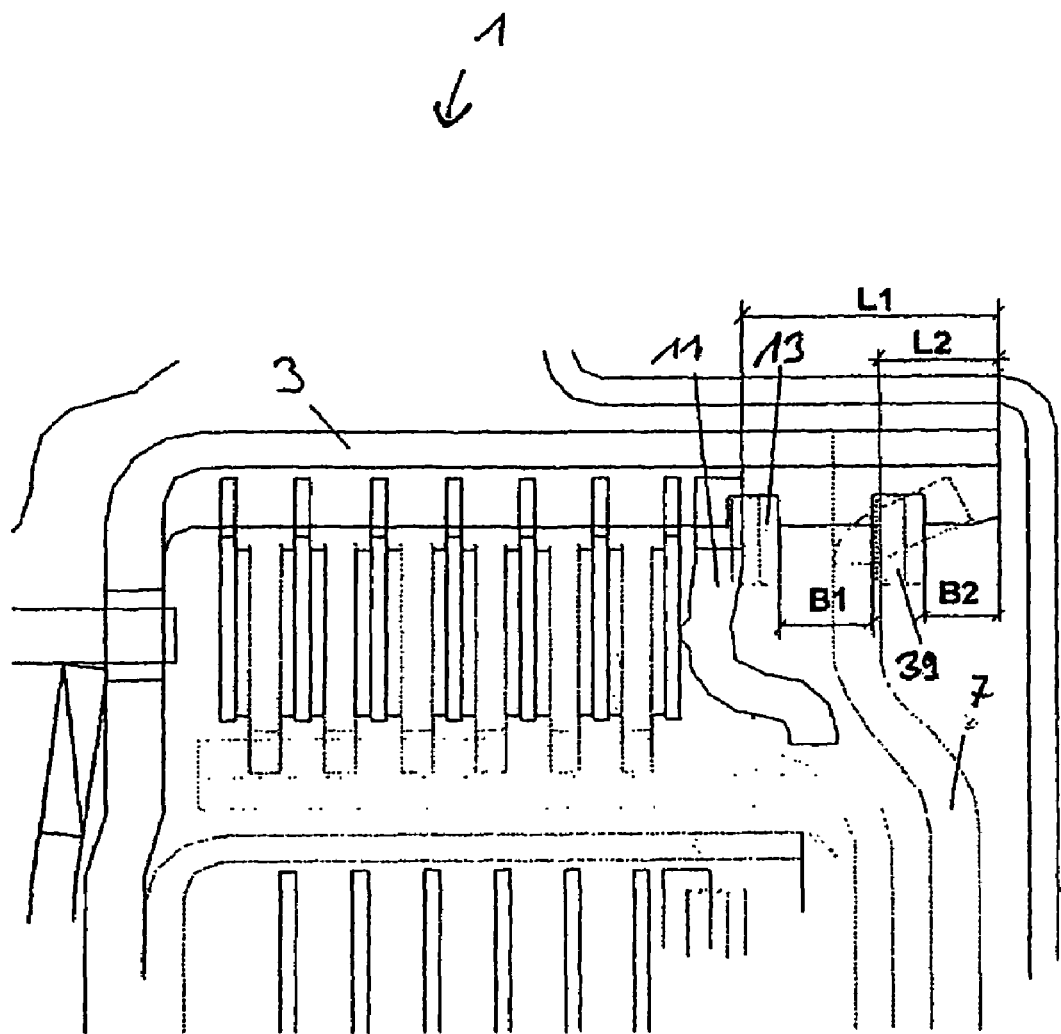
FIG. 2, shows an axial section through a power transmission unit according to the prior art.

FIG. 2 shows a power transmission unit 1 according to the prior art. The drive plate 7 is fixed in the axial direction by means of a snap ring 39. The back plate 11 is fixed with an additional snap ring 13. It is clear that the axial fixing by means of two snap rings 13 and 39 and the necessary collar lengths B1 and B2 require a relatively long length L1 of axial space.

With the embodiment of the power transmission unit 1 according to the invention, the axial length L3 indicated in FIG. 1 is shorter than the length L1 by the difference between length L2 and length L4; in actual practice, an axial space on the order of approximately 5 mm can be achieved in the outer region of the external disk carrier 3.

Figure 3:
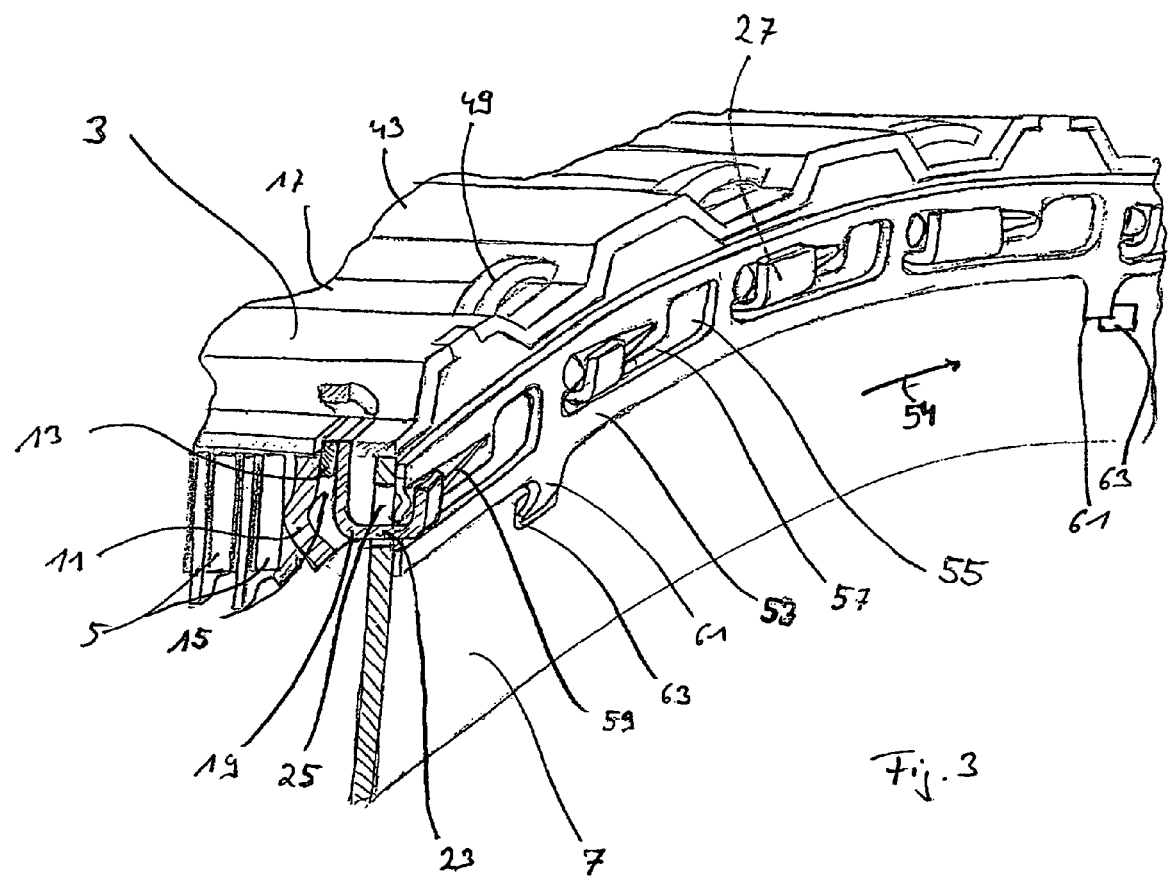
FIG. 3, shows a detail of a second embodiment of a power transmission unit in a perspective depiction.
Figure 4:
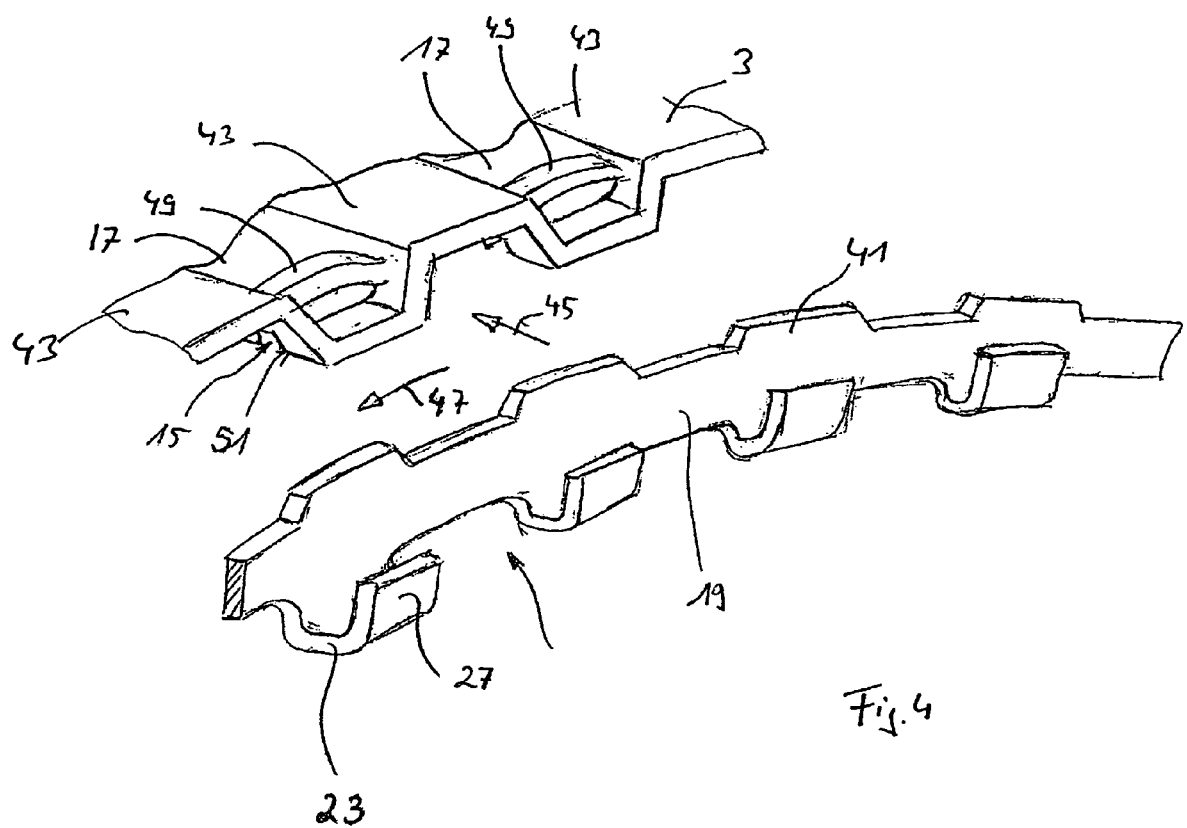
FIG. 4, shows a detail of a securing element according to FIG. 3 in a perspective depiction.
Figure 8:
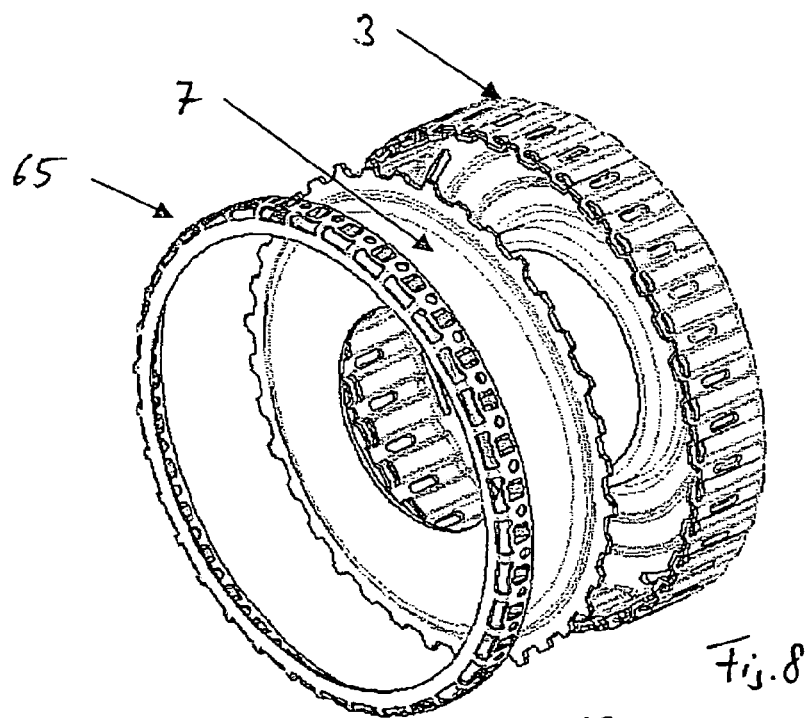
Figure 9:
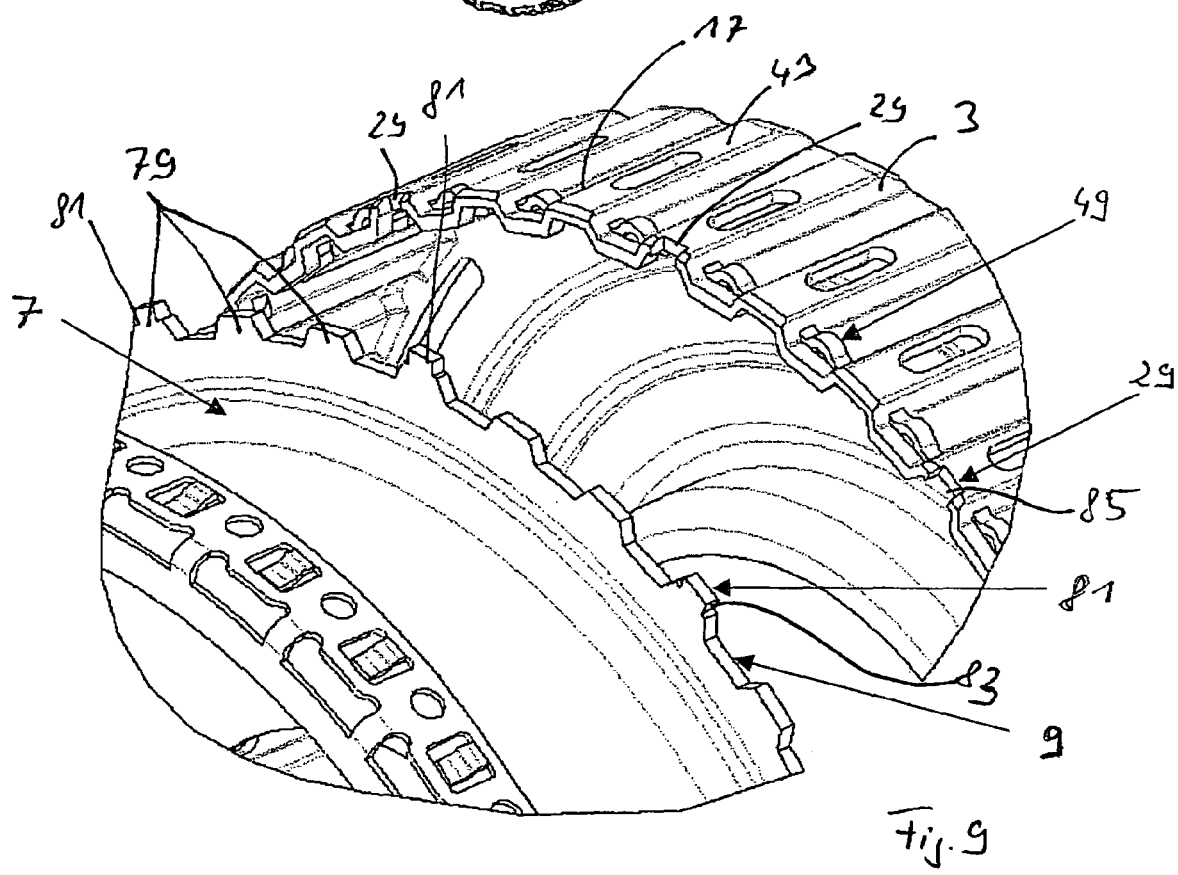
FIG. 9, shows an enlargement of a detail from FIG. 8, FIG. 10, is a perspective depiction of the disk carrier, with an inserted drive plate and a ring that is not yet fixed.

FIGS. 3 and 4 show another exemplary embodiment of the invention. Here, the closed annular securing element 19 is not clamped between the back plate 11 and the snap ring 13. In the outer region, the securing element 19 has radially protruding external teeth 41 that can be inserted axially into the axial grooves 43 of the external disk carrier 3. When assembled, the securing element 19 is fixed in the external disk carrier 3 in that first, the securing element 19 is inserted axially into the external disk carrier 3 in the direction 45, the external teeth 41 being slid into the axial grooves 43. Then, the securing element 19 is rotated in the circumference direction 47, causing the external teeth to pivot into the securing ring groove 15. The securing ring groove 15 is let into the axial ribs 17 of the external disk carrier in the circumference direction. When the groove 15 is produced without material-removing machining, a standard production process produces bridge pieces 49 that protrude in the radial direction and extend in the circumference direction, parallel to the securing ring groove 15.

The securing ring groove 15 accommodates not only the snap ring 13 for the back plate 11, but also the securing element 19. Naturally, it is also possible to provide a separate securing ring groove for the securing element 19, but this further increases the length of the external disk carrier. In the exemplary embodiment shown, the disks 5, the back plate 11, and the snap ring 13 have already been preassembled. When the securing element 19 is rotated, the external teeth 41 slide between the snap ring 13 and the outer groove wall 51 of the securing ring groove 15.

After the securing element 19 is a fastened to the external disk carrier 3, the drive plate 7 is placed onto the holding fingers 23. The external teeth 9 of the drive plate 7 engage in the axial grooves 43 of the external disk carrier 3. This axial joining procedure slides the ends 27 of the holding fingers 23, which are bent by approximately 90°, through axial openings 25 in the drive plate 7.

Then, a closed, flat preloading ring 53 exerts an axial preloading force on the drive plate. The preloading ring has windows 55 that permit the bent ends 27 of the axial holding fingers 23 to slide through. The windows 55 each extend into a slot 57 in the circumference direction. Along a long side of each slot 57, a ramp 59 is provided that expands axially in the circumference direction. When the preloading ring 53 is rotated in the circumference direction 54, it functions as a bayonet locking mechanism. The ramps 59 travel under the bent ends of the holding fingers 23, exerting an axial traction on the holding fingers 23. This causes the securing element 19 to flatten out, generating an elastic preloading force on the drive plate 7.

To assure favorable contact conditions between the ramps 59 and the bent ends 27, it is possible for the bent ends 27 to be bent in the circumference direction, which is not shown in the drawings.

To prevent the preloading ring 53 from loosening again under operating conditions, it is fixed in the circumference direction. In this case, tabs 61 provided on the inner circumference of the preloading ring 53 are bent into corresponding windows 63 of the drive plate 7. Naturally, other fixing means are also conceivable, e.g. welding spots can be provided or the preloading ring can be screw mounted.

FIGS. 5 through 16 show exemplary embodiments of the invention in which the axial fixing means are attached to the disk carrier 3 from the outside. To this end, a closed, bent ring 65 is provided, which has an axial ring section 67 coaxial to the disk carrier 3 and a radial ring section 69 bent inward by approximately 90° in relation to it. The two ring sections 67 and 69 are connected to each other by connecting pieces 71 distributed over the circumference.

The axial ring section 67 has resilient tabs 73 distributed over its circumference, which extend in the axial direction and are bent toward the disk carrier, the free ends 75 pointing in the direction of the radial ring section 69. When the axial ring section 67 of the ring 65 is slid axially onto the external disk carrier 3, the inwardly protruding tabs 73 snap over the bridge pieces 49 of the securing ring groove 13. As has already been mentioned above, the bridge pieces 49 are produced with the manufacture of the securing ring groove 13 in the axial ribs 17 in the external disk carrier. The radial ring section 69 is embodied in the form of a disk spring that is preloaded when the tabs 73 have been snapped into place and consequently presses the external teeth 9 of the drive plate 7 against stops 29 in the external disk carrier 3. This generates a non-positive, frictional engagement between the drive plate 7 and the external disk carrier 3, which, with a corresponding contact force of the disk spring, prevents the drive plate 7 and the external disk carrier 3 from striking each other and consequently prevents rattling noise.

FIG. 6 shows a section along the cutting line 64 indicated in FIG. 5, which extends centrally along an axial rib 17 of the external disk carrier 3.

FIGS. 7 and 7a show the same exemplary embodiment as FIGS. 5 and 6. In FIG. 7a, a cutting line 77 extends along an axial groove 43 of the external disk carrier 3. FIG. 7a shows the section along the cutting line 77.

As is clear in the perspective depictions in FIGS. 8 through 13, the drive plate 7 is provided with regular external teeth 9. Each axial groove 43 of the external disk carrier 3 is associated with a tooth 79 on the outer circumference of the drive plate 7. The teeth 79 are embodied as complementary in form to the axial grooves 43 of the external disk carrier. The tooth thickness of the teeth 79 in the circumference direction is embodied so that there is almost no play between the drive plate 7 and the external disk carrier 3. Axially fixing the drive plate 7 in the direction of the disk pack requires a number of axial stops 29 between the drive plate 7 and the external disk carrier 3. At least two, but preferably a number of teeth 81 of the external denticulation 9 of the drive plate are elongated in the radial direction; the radial extensions 83 engage in recesses 85 that are open at the ends of the axial grooves 43 and rest axially against the disk carrier 3. Since the recesses 85 at the bottom of the axial grooves 43 can be produced regardless of the position of the securing ring groove 15 situated in the axial ribs, the drive plate 7 can be positioned close enough to the securing ring groove 15 to almost touch it. This achieves an additional advantage in terms of space. The short distance A depicted in FIG. 7a between the stop 29 and the securing ring groove 15 of the snap ring 13 is required for tolerance reasons and due to the elasticity of the components in order to thus prevent the drive plate 7 from resting against the snap ring 13.

In the exemplary embodiment depicted in FIGS. 5 through 13, the tabs 73 engage behind the bridge pieces 49 produced during the stamping of the securing ring groove 15. When the axial ring section 67 is slid on, the tabs snap into place behind these bridge pieces.

Figure 10:
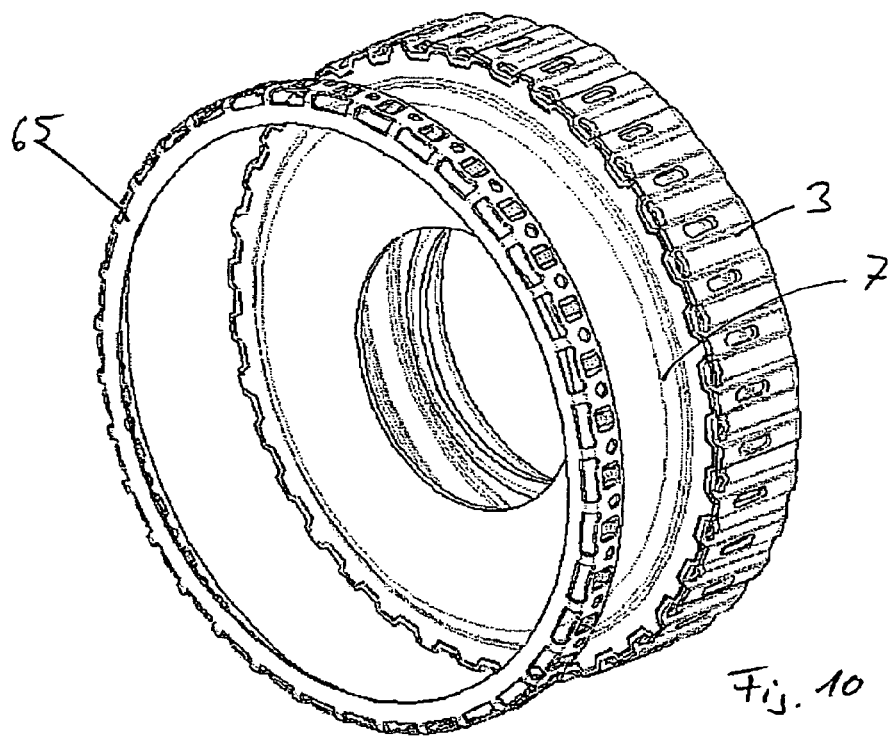
Figure 11:
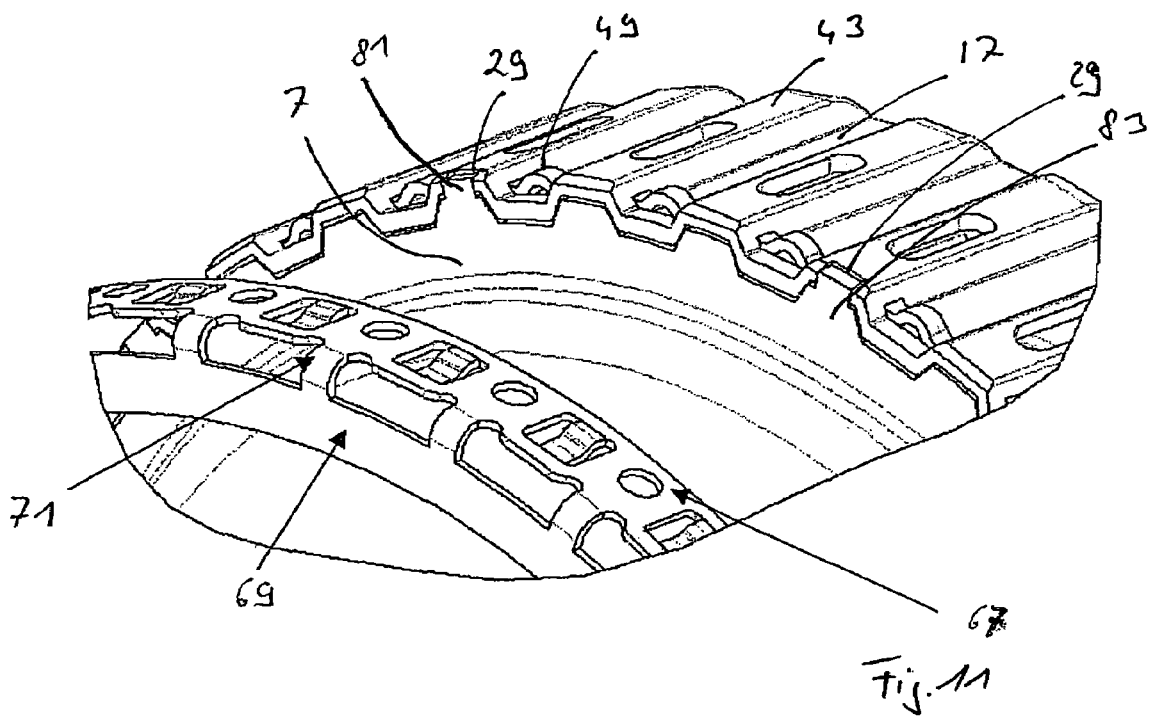
FIG. 11, shows an enlargement of a detail from FIG. 10, FIG. 12, is a perspective view of a disk carrier, with a drive plate that is fixed by means of a ring.

FIG. 10 shows the external disk carrier 3, with a drive plate 7 already resting against the stops 29. The drive plate 7 rests against the stops 29 by means of the elongated teeth 81. Because each tooth 79 is capable of transmitting a partial torque to the disk carrier 3, a significantly higher torque can be transmitted than with the clutches according to the prior art.

Another significant advantage is the simplified assembly since the embodiment of the power transmission unit according to the invention makes it possible to eliminate a dovetail-shaped denticulation. Naturally, it is also possible, despite the embodiment of the power transmission unit according to the invention, to embody the teeth 79 of the external denticulation 9 of the drive plate 7 in the shape of dovetails. In this version, the ring 65 has no holding function to prevent the external disk carrier 3 from expanding radially during rotation. Since the embodiment according to the invention makes it possible to eliminate a snap ring for fixing the drive plate 7, theoretically, even with a dovetail-shaped denticulation, all of the teeth can transmit a torque in the circumference direction so that even this embodiment version increases the maximum torque that the power transmission unit is able to transmit.

Figure 12:
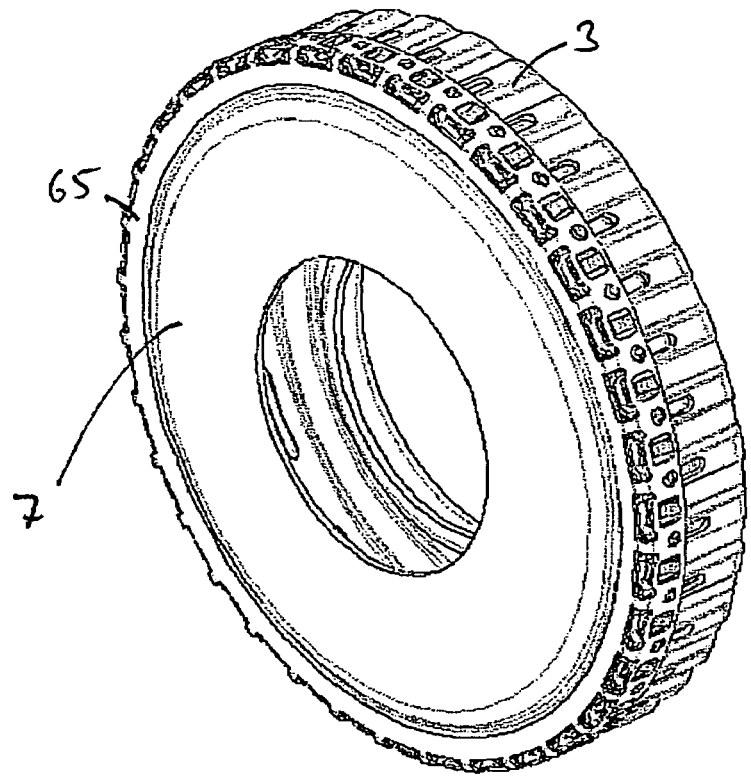
Figure 13:
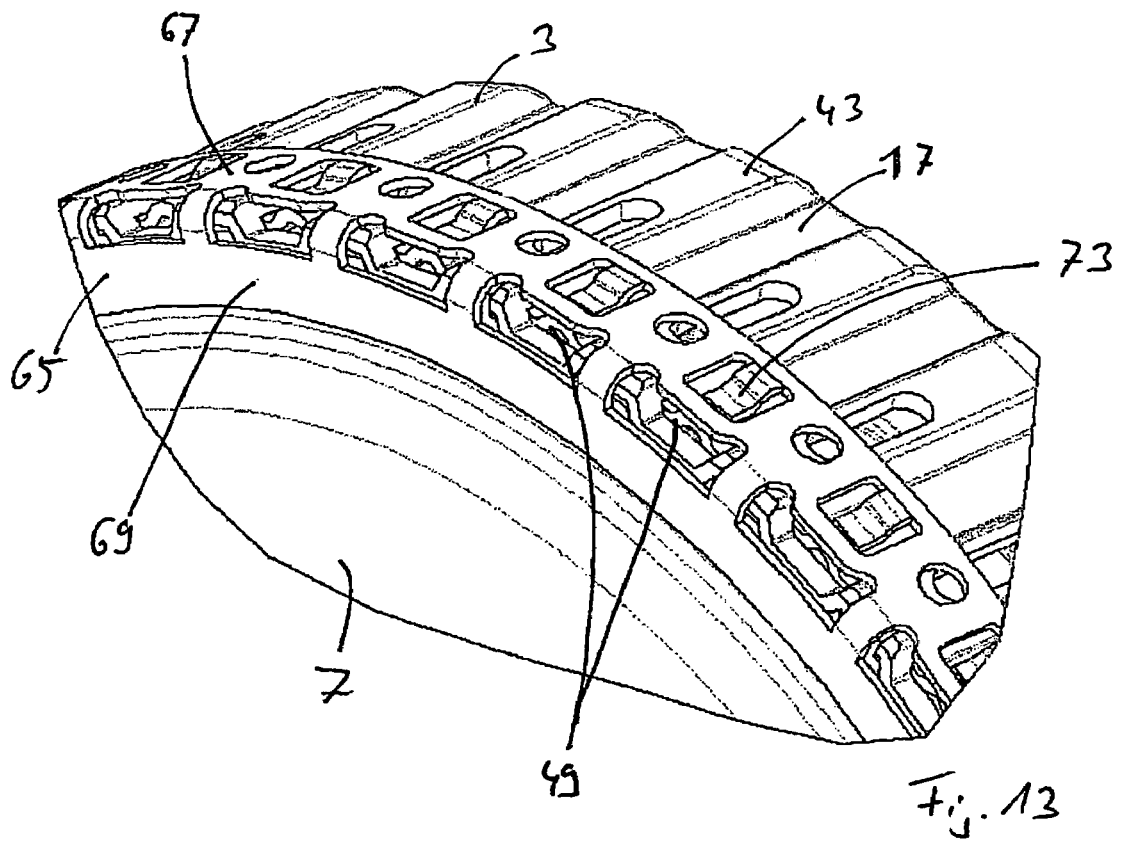
FIG. 13, shows an enlargement of a detail from FIG. 12, FIG. 14, is an axial section through an embodiment form of a power transmission unit.

FIGS. 12 and 13 show the ring 65 with its axial ring section 67 already fastened to the external disk carrier 3 from the outside. The tabs 73 engage behind the bridge pieces 49. The radial ring section 69 embodied in the form of a disk spring presses the drive plate 7 against the stops 29 in the axial direction.

Figure 14:
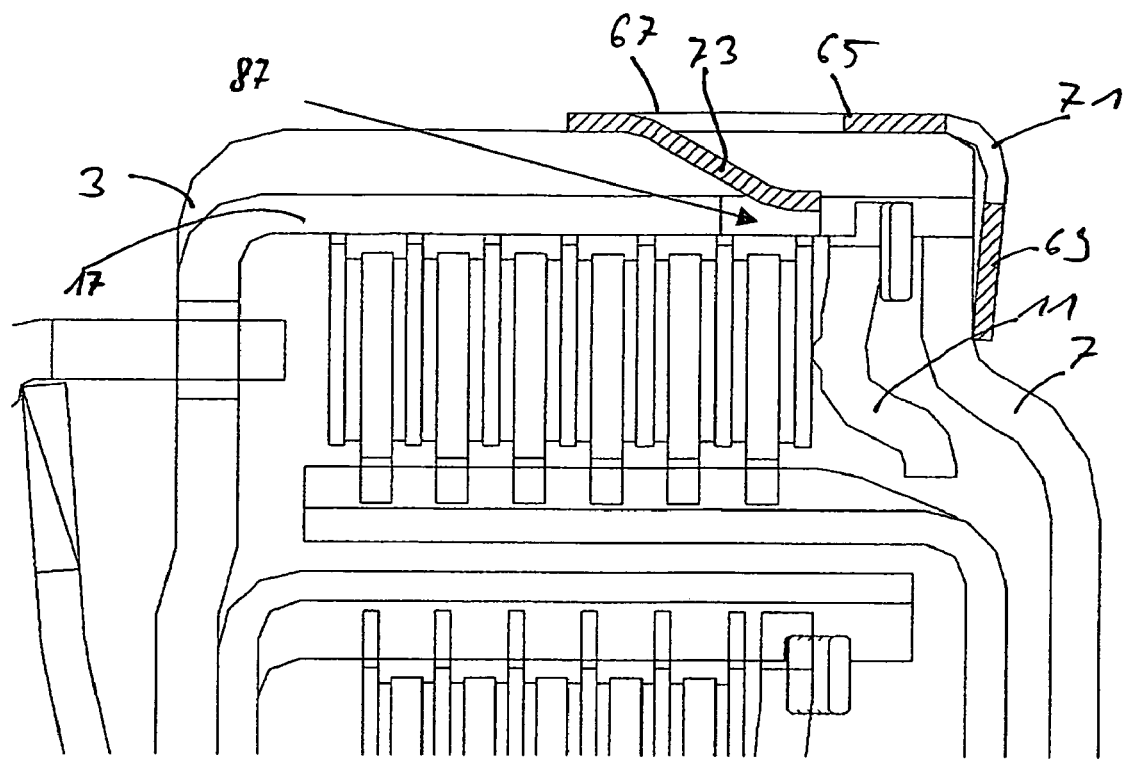

The tabs 73 do not absolutely have to engage behind the bridge pieces 49. FIG. 14 shows that the tabs 73 can also be embodied so that they can engage in the oil windows 87 of the external disk carrier. In FIG. 14, the oil window is provided in an axial rib 17 of the external disk carrier 3.

Figure 15:
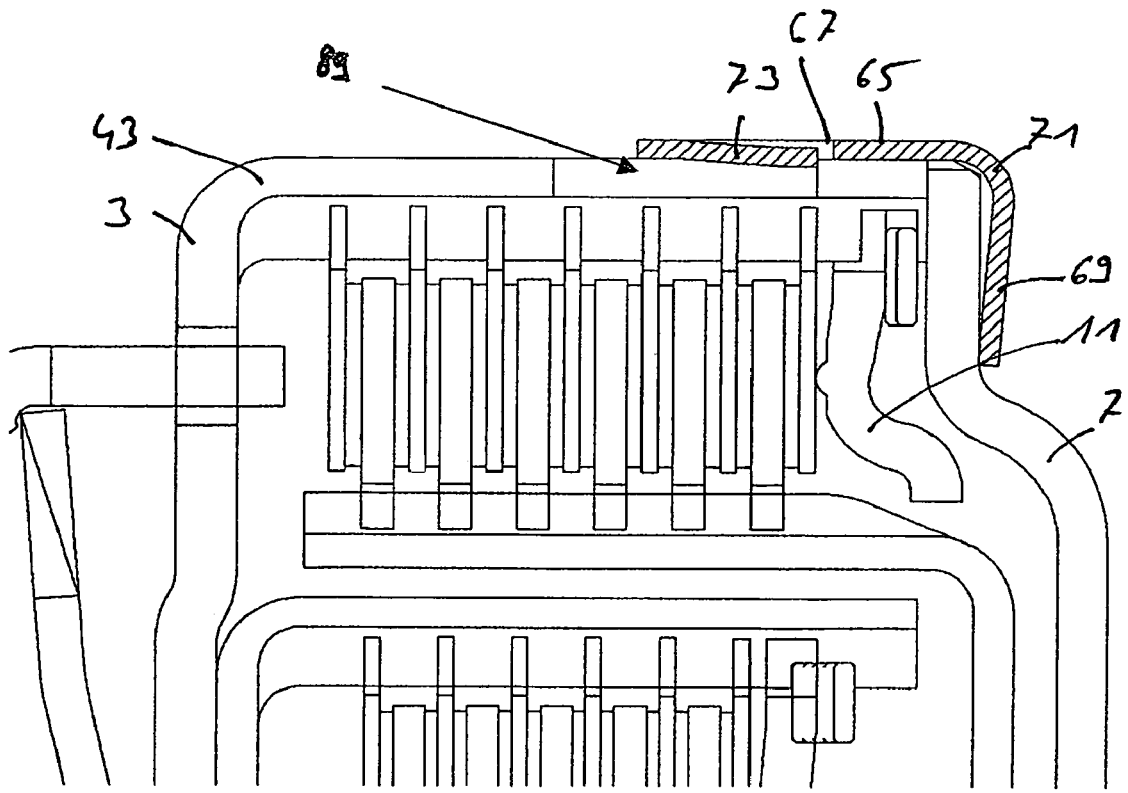
FIG. 15, is an axial section through an embodiment form of a power transmission unit.

As shown in FIG. 15, it is also possible for the tabs 73 to engage in oil windows 89 in the axial grooves 43 of the external disk carrier 3.

Figure 16:
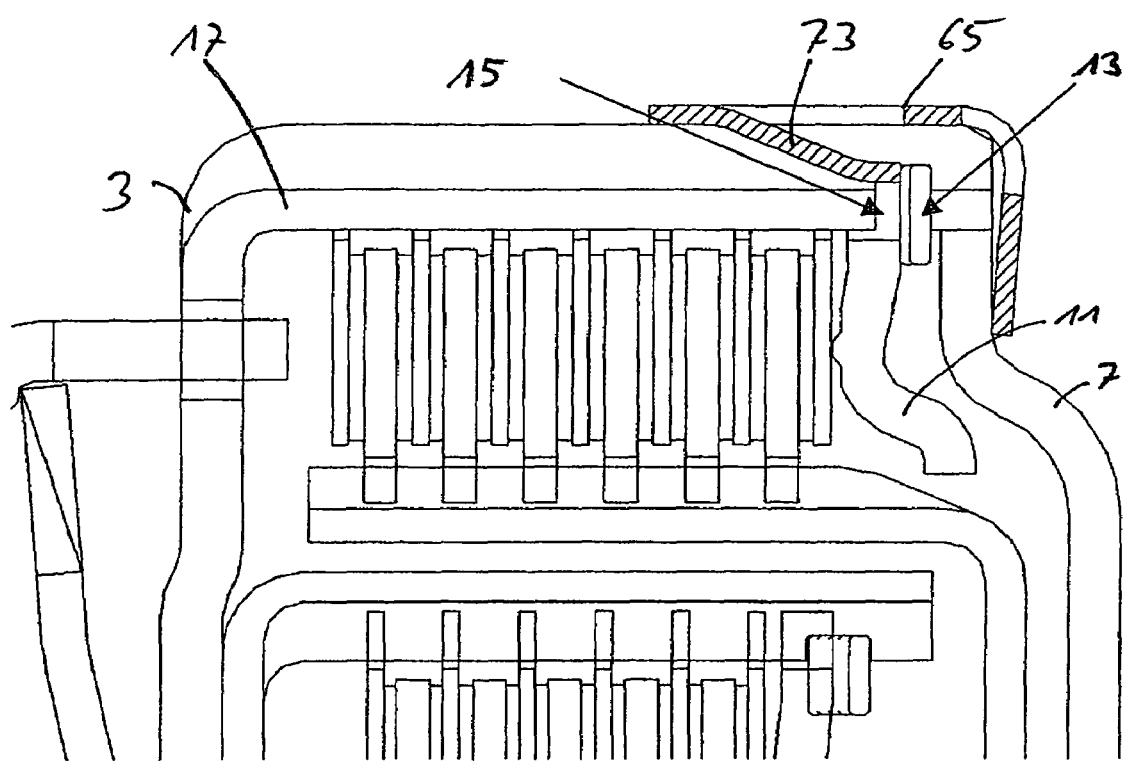
FIG. 16, is an axial section through an embodiment form of a power transmission unit.

FIG. 16 shows another version. Here, the tabs 73 are hooked behind the snap ring 13. To this end, it is necessary to pierce the securing ring groove 15 in the axial rib 17 of the external disk carrier 3.

Figure 17:
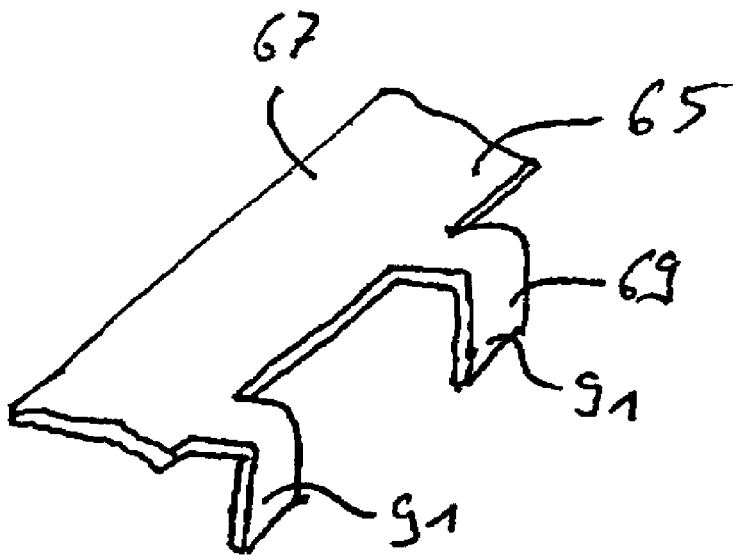
FIG. 17, shows an embodiment version of the ring.

FIG. 17 shows another simplified version of the bent ring 65. This ring 65 also has an axial ring section 67 situated coaxial to the disk carrier and a radial ring section 69 bent inward by 90° in relation to it. The radial ring section 67, however, is not embodied as a disk spring but is instead comprised of resilient tabs 91 that are distributed over the circumference, point in the radial direction, and are not connected to one another in the circumference direction. This version has the advantage of an increased elasticity with the same material thickness.

Figure 18:
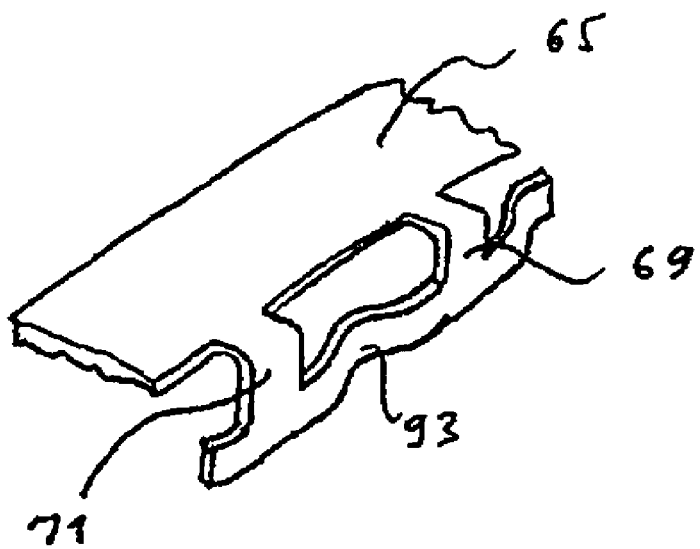
FIG. 18, shows another embodiment version of the ring.

FIG. 18 shows another embodiment version of the ring 65. Here, the circumferential ring section (93) of the radial ring section 69 is embodied not in the form of a disk spring, but in the form of a bending spring. The ring section 69 is provided with an axial waviness in the circumference direction and thus exerts a spring action on the drive plate 7. This version also has the advantage of an increased degree of elasticity.

The tabs 73 for fastening the ring 65 to the disk carrier 3 are not shown for the sake of clarity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmission unit comprising:
a multiple disk clutch or friction brake, including a disk carrier that has at least one disk, said at least one disk having external teeth and being fastened to the disk carrier in a non-rotating fashion, said disk carrier, including a cylinder section oriented toward said at least one disk; said cylinder section having axial grooves and axial ribs distributed over the circumference in alternating fashion and being connected to a hub on one side by a drive plate spaced axially apart from said at least one disk;
a non-rotatable connection between the drive plate and the disk carrier being produced by plug-in teeth in order to transmit a torque;
an axial fastening arrangement having an annular securing element axially fastened to the disk carrier, the axial fastening arrangement embodied so that axial forces that the drive plate exerts on the disk carrier exclusively engage the region of the disk carrier that extends axially from the drive plate in the direction of at least one disk; and
one or more holding fingers distributed over a circumference of said annular securing element, said one or more holding fingers point axially toward the drive plate and are guided through axial openings in the drive plate.

2. The power transmission unit according to claim 1, wherein the drive plate is axially supported against the disk carrier with the side oriented toward said at least one disk by at least part of teeth provided on an external denticulation.

3. The power transmission unit according to claim 1, wherein the axial fastening arrangement engages the drive plate behind the side of the drive plate oriented away from the disks.

4. The power transmission unit according to claim 1, wherein the axial fastening arrangement is embodied so that the drive plate is preloaded in the axial direction against the disk carrier.

5. The power transmission unit according to claim 1, wherein the axial fastening arrangement is fastened to the disk carrier from its inside.

6. The power transmission unit according to claim 1, wherein the free ends of the holding fingers are bent and engage behind the drive plate with the bent end.

7. The power transmission unit according to claim 1, wherein between the disks and the drive plate, a back plate is provided to axially fix the disks, which back plate is fastened to the disk carrier by means of a snap ring, the securing element being clamped between the back plate and the snap ring or between the snap ring and the groove wall.

8. The power transmission unit according to claim 1, wherein the bent ends of the holding fingers are accommodated in radial recesses.

9. The power transmission unit according to claim 1, wherein the holding fingers preload the drive plate axially against the disk carrier, the securing element being embodied as a disk spring for storing the axial preloading force in a sprung fashion and/or the holding fingers are embodied as resilient, bending springs.

10. The power transmission unit according to claim 1, wherein the securing element has external teeth with which it is secured to the disk carrier in the circumference direction.

11. The power transmission unit according to claim 10, wherein the external teeth of the securing element correspond to the external teeth of the disks.

12. The power transmission unit according to claim 1, wherein the securing element is provided with at least one means for positioning in the circumference direction, the means being embodied in the form of a hook that engages in an axial recess in the back plate.

13. The power transmission unit according to claim 1, wherein the securing element is non-detachably connected to the back plate and is embodied as integrally connected to the back plate.

14. The power transmission unit according to claim 1, wherein the all of the teeth of the external denticulation of the drive plate are embodied so that they transmit a torque to the disk carrier.

15. The power transmission unit according to claim 1, wherein the annular securing element has external teeth that permit it to be inserted into a circumferential groove in the disk carrier, which groove is provided in the axial ribs of the disk carrier, through axial insert of the external teeth of the securing element into the axial grooves of the disk carrier and subsequent rotation of the securing element in the circumference direction.

16. The power transmission unit according to claim 15, wherein a closed preloading ring is provided axially in between the bent ends of the holding fingers and the drive plate, and is for axially preloading the drive plate; the preloading ring resting against the drive plate on the one hand and against the bent ends of the holding fingers on the other.

17. The power transmission unit according to claim 16, wherein the preloading ring has slots extending in the circumference direction distributed over its circumference to permit the holding fingers to pass through; along at least one longitudinal slot side of a slot, preferably of each of them, a ramp is provided, which widens axially the circumference direction; and generates the preloading of the drive plate against the disk carrier by rotating the preloading ring in the circumference direction.

18. The power transmission unit according to claim 16, wherein the bent ends of the holding fingers are bent in the circumference direction.

19. The power transmission unit according to claim 16, wherein the preloading ring is fastened to the drive plate in a rotationally fixed manner, preferably with frictional, non-positive engagement.

20. The power transmission unit according to claim 19, wherein in order to fasten the preloading ring to the drive plate, at least one tab is provided on the preloading ring and is bended into a corresponding window in the drive plate.

21. The power transmission unit according to claim 19, wherein a number of tabs are provided over the circumference of the preloading ring; a similar number of windows are provided in the drive plate; the tabs and the windows are arranged in different circumference positions; after the preloading disk is rotated by a small rotation angle, at least one tab is flush with a window so that the tab can be bent into the window.

22. A power transmission unit comprising:
a multiple disk clutch or friction brake;
a disk carrier that has at least one disk, said disk carrier part of said multiple disk clutch or friction brake, said at least one disk having external teeth and being fastened to the disk carrier in a non-rotating fashion;
a cylinder section which is part of said disk carrier, said cylinder section oriented toward said at least one disk, said cylinder section having axial grooves and axial ribs distributed over the circumference in alternating fashion and being connected to a hub on one side;
a drive plate spaced axially apart from said at least one disk, said axial grooves and axial ribs connected to said hub by said drive plate;
a non-rotatable connection between the drive plate and the disk carrier being produced by plug-in teeth in order to transmit a torgue; and
an axial fastening arrangement having a closed, bent ring, which has an axial ring section situated coaxial to the disk carrier and a radial ring section; the axial annular section of the bent ring being fastened to the disk carrier and the ring rests with its radial ring section against the drive plate, and the axial fastening arrangement causes axial forces that the drive plate exerts on the disk carrier to exclusively engage the region of the disk carrier that extends axially from the drive plate in the direction of at least one disk.

23. The power transmission unit according to claim 22, wherein the axial ring section has resilient tabs that are distributed over its circumference, extend in the axial direction, and are bent inward in order to fasten it directly or indirectly to the disk carrier, the free ends of the tabs pointing in the direction of the radial ring section.

24. The power transmission unit according to claim 23, wherein the radial ring section is comprised of resilient tabs that are distributed over the circumference and point with their free ends in the radial direction.

25. The power transmission unit according to claim 23, wherein the radial ring section has a ring section extending in the circumference direction, which is provided with an axial waviness in the circumference direction; preferably, the ring section is connected to the axial ring section by means of a number of connecting pieces spaced apart from one another in the circumference direction.

26. The power transmission unit according to claim 23, wherein the free ends of the tabs engage behind radial projections in the disk carrier, in particular behind axial ribs of a securing ring groove extending in the circumference direction and provided for a snap ring, or engage in radial recesses in the disk carrier or into radial openings in the disk carrier, particularly in oil windows of the disk carrier.

27. The power transmission unit according to claim 26, wherein the radial ring section is embodied in the form of a disk spring, which is preloaded when the tabs are engaged and presses the drive plate axially against stops in the disk carrier.

28. The power transmission unit according to claim 26, wherein the axial ring section and the radial ring section are connected to each other by a number of connecting pieces that are spaced apart from one another in the circumference direction.

29. The power transmission unit according to claim 26, further comprising a number of teeth, formed on an external denticulation of the drive plate, which corresponds to the number of axial grooves in the disk carrier, the teeth being accommodated in the axial grooves.

30. The power transmission unit according to claim 29, further comprising the contour of the teeth and the width of the teeth in the circumference direction, is embodied so that there is almost no play in the circumference direction between the external teeth of the drive plate and the side walls of the axial grooves of the disk carrier.

31. The power transmission unit according to claim 29, further comprising several teeth of the external denticulation of the drive plate are elongated in the radial direction; the radial extension engages in recesses that are open at the ends of the axial grooves and rest axially against the disk carrier.

32. The power transmission unit according to claim 31, wherein the recesses extend in the axial direction substantially all the way to a snap ring extending around the circumference in the disk carrier.

* * * * *